United States Patent
Dusselier et al.

(10) Patent No.: US 10,407,623 B2
(45) Date of Patent: Sep. 10, 2019

(54) BIPHASIC SOLVENT CATALYTIC PROCESS FOR THE DIRECT PRODUCTION OF LIGHT NAPHTHA FROM CARBOHYDRATE-CONTAINING FEEDSTOCK

(71) Applicant: Katholieke Universiteit Leuven, K.U.Leuven R&D, Leuven (BE)

(72) Inventors: Michiel Julien Dusselier, Kessel-Lo (BE); Beau Op De Beeck, Kaggevinne (BE); Bert Frans Sels, Westerlo (BE)

(73) Assignee: Katholieke Universiteit Leuven, K.U. Leuven Research & Development, Leuven (BE)

( * ) Notice: Subject to any disclaimer, the term of this patent is extended or adjusted under 35 U.S.C. 154(b) by 180 days.

(21) Appl. No.: 15/316,323

(22) PCT Filed: May 12, 2015

(86) PCT No.: PCT/BE2015/000025
§ 371 (c)(1),
(2) Date: Dec. 21, 2016

(87) PCT Pub. No.: WO2015/172208
PCT Pub. Date: Nov. 19, 2015

(65) Prior Publication Data
US 2017/0190978 A1    Jul. 6, 2017

Related U.S. Application Data

(60) Provisional application No. 61/992,104, filed on May 12, 2014.

(51) Int. Cl.
*C10G 3/00* (2006.01)
*C10G 1/08* (2006.01)

(52) U.S. Cl.
CPC ............... *C10G 1/086* (2013.01); *C10G 3/44* (2013.01); *C10G 3/50* (2013.01); *Y02P 30/20* (2015.11)

(58) Field of Classification Search
CPC .. C10G 1/086; C10G 3/44; C10G 3/50; Y02P 30/20
See application file for complete search history.

(56) References Cited

U.S. PATENT DOCUMENTS 5,516,960 A    5/1996  Robinson et al.
6,953,873 B2  10/2005  Cortright et al.
(Continued)

FOREIGN PATENT DOCUMENTS

WO    2007075370 A2    7/2007
WO    2012162001 A1   11/2012
WO    2015172208 A1   11/2015

OTHER PUBLICATIONS

PCT International Preliminary Report on Patentability, PCT/BE2015/000025, dated Nov. 15, 2016.
(Continued)

Primary Examiner — Randy Boyer
Assistant Examiner — Juan C Valencia
(74) Attorney, Agent, or Firm — TraskBritt

(57) ABSTRACT

The disclosure describes a one-step liquid biphasic catalytic process for converting a carbohydrate-containing feedstock, preferably lignocellulose, to light naphtha (e.g., hexane, pentane, methyl cyclopentane, cyclohexane, etc.) in the presence of an acidic reactive aqueous phase and a redox catalyst in the organic extracting/reaction phase. The process provides a cost-effective route for producing light-naphtha components, in presence or not of deoxygenates. The light naphtha components are useful as feedstock for steam and catalytic cracking to produce value-added platform molecules like ethylene and propylene, as precursor for the (Continued)

synthesis of bioaromatics like benzene and as gasoline fuel feedstock, and as fuel additives (e.g., the concomitantly formed oxygenates) to improve the biological origin of carbon in the fuel.

24 Claims, 5 Drawing Sheets

(56) References Cited

U.S. PATENT DOCUMENTS

| | | |
|---|---|---|
| 8,455,705 B2 | 6/2013 | Cortright et al. |
| 9,303,226 B2 * | 4/2016 | Chheda .................... C10G 3/46 |
| 2012/0302765 A1 * | 11/2012 | Dumesic .............. C07D 307/50 |
| | | 549/326 |
| 2013/0055626 A1 | 3/2013 | Bauldreay et al. |
| 2013/0118059 A1 | 5/2013 | Lange et al. |

OTHER PUBLICATIONS

PCT International Written Opinion, PCT/BE2015/000025, dated Sep. 16, 2015.
PCT International Search Report, PCT/BE2015/000025, dated Sep. 16, 2015.

* cited by examiner

BIPHASIC SOLVENT CATALYTIC PROCESS FOR THE DIRECT PRODUCTION OF LIGHT NAPHTHA FROM CARBOHYDRATE-CONTAINING FEEDSTOCK

CROSS-REFERENCE TO RELATED APPLICATIONS

This application is a national phase entry under 35 U.S.C. § 371 of International Patent Application PCT/BE2015/000025, filed May 12, 2015, designating the United States of America and published in English as International Patent Publication WO 2015/172208 A1 on Nov. 19, 2015, which claims the benefit under Article 8 of the Patent Cooperation Treaty to U.S. Provisional Patent Application Ser. No. 61/992,104, filed May 12, 2014.

TECHNICAL FIELD

The application is directed to a process for selectively converting carbohydrates or carbohydrate-containing feedstock and, more preferably, cellulose, under hydrogen pressure to yield a mixture of light naphtha, mainly comprising, but not limited to, n-hexane, n-pentane, cyclohexane and methylcyclopentane.

Presence of oxygenate side-products, potential chemicals and fuel additives, is easily controlled kinetically and technologically. Particularly advantageous is that the process operates directly from solid carbohydrate-containing biomass like lignocellulosic feedstock at appreciably high loadings (preferably from 5 to 25 wt %) and achieves extraordinary high carbon yields for components having C5 to C6 carbon atoms (over 80% of carbon yield at full carbohydrate conversion); and delivers the light naphtha as an easy separable fraction.

The process uses a two-phase reactor system, wherein the carbohydrate-containing feedstock or polymer is hydrolyzed and the resulting monosaccharides dehydrated to 5-HMF in an aqueous phase containing an acid catalyst, while the organic phase (preferably an alkane) contains a special redox catalyst, converting 5-HMF toward the alkanes through several cycles of dehydration/hydrogenation and/or formal hydrodeoxygenation.

High affinity of the redox catalyst for apolar solvents and high selectivity of the catalyst to rapidly hydrogenate HMF in presence of glucose, as well as reactor temperature control, are essential elements to attain appreciable alkane yields.

BACKGROUND

The use of lignocellulose and carbohydrate-containing biomass, in general as a renewable feedstock for the synthesis of fuels, chemicals and materials, is promising as (lingo)cellulose and, thus, carbohydrate biomass, and is Earth's most abundant source of organic carbon. In light of the high prices and future lower availability of especially fossil-derived crude oil and all its derivative fractions such as light naphtha, diesels and jet fuels, efficient processes to convert carbohydrate-containing biomass into these fractions are highly desired. Although natural gas is still largely available, this mixture of short alkanes (containing less than 4 carbon atoms) is not easily converted into a light naphtha fraction without going through the expensive and highly energy-demanding combination of syngas production and Fischer-Tropsch processing of the derived syngas. Renewable and efficient processes for the conversion of carbohydrate-containing biomass into hydrocarbon rich fractions that are now obtained from crude oil are thus highly desired.

Mild catalytic processing of carbohydrate-containing biomass could be a promising method to transform this highly oxygen-functionalized feedstock into mixtures of alkanes, such as light naphtha, diesels and others fuels that are lean in oxygen atoms and contain a high number of combustible C—H bonds. With respect to pyrolysis and gasification, catalytic processes are more selective and demand less stringent conditions; whereas, with respect to enzymatic and biological processes, catalytic processes are faster and usually operate at higher productivities. The latter is needed in this context because the economic value of a fuel or alkane fraction per weight is usually low, but the targeted volumes and markets are huge. Process and energy cost for their synthesis should be kept to an absolute minimum.

Producing fuels and alkanes from biomass feedstock via catalytic processing primarily concentrates on sequential depolymerization of polysaccharides (if a polymeric feedstock is used), the formation of intermediates, the coupling of such intermediates and finally the deoxygenation of such intermediates or coupled intermediates to produce molecules with high heating value like alkanes and aromatics. There are elaborate examples in literature describing the production of new biofuels with often unique chemical structures that are, in fact, C—C coupled and (partially) deoxygenated chemicals made from biomass-derived sugars, sugar alcohols or other carbohydrate-biomass-derived platform molecules such as HMF, levulinic acid, angelica lactone, etc. A textbook example is the (cross-)coupling of 5-HMF with acetone or itself before deoxygenation to C7 to C15 range of alkanes with an expensive $Pt/SiO_2$—$Al_2O_3$ catalyst (Huber et al., Science 2005 vol. 308, pp. 1446-1450). Another recent example is the deoxygenation of the angelica lactone dimer into a similar range of diesel-like products with a two-rare-element-containing Ir—$ReO_x/SiO_2$ catalyst (Mascal et al., Angew. Chem. Int. Ed. 2014, vol. 53, p. 1854). Again, another example is the synthesis of biofuel dimethylfuran from fructose (the isomer of glucose) using CuRu on carbon catalyst (Roman-Leshkov et al., Nature vol. 447 pp. 982-985). An overview of current biofuel technologies can be found in the following reviews: Huber et al., Chem. Rev. 2007 vol. 106 pp. 4044-4098; and Climent et al., Green Chem. 2014, vol. 1 pp. 516-547.

A related state-of-the-art technology is the aqueous phase-reforming (APR) process in which the oxygen content of carbohydrates and the feedstocks derived therefrom is reduced with in-situ-generated $H_2$, so that the products are (after final hydrotreating) hydrocarbons. This APR is based on work originally described by Huber, Cortright, and Dumesic in (Huber et al., Science 2005 vol. 308 pp. 1446-1450; and Huber et al., Angew. Chem. Int. Ed. 2004 Vol. 43 pp. 1549-1551). APR is now being commercially developed by Virent, Inc., and often acid- or base-catalyzed coupling of intermediates is also applied to obtain higher carbon numbers in the product before deoxygenation (Bauldreay et al., U.S. 2013/0055626 A1; Cortright et al., U.S. Pat. No. 8,455,705 B2; and related or affiliated patents such as U.S. Pat. No. 6,953,873 B2 and WO2007075370). Such processes have the advantage that the product hydrocarbons are already well integrated as fuels in existing automotive and engine infrastructure. The major disadvantage is that the method operates only on monosaccharide or disaccharide sugars or starch, but the examples are not directly on cellulose or cellulosic biomass. Moreover, a complex metal catalyst is required and the overall yield of hydrocarbon products is medium to low as substantial amounts of carbon are lost in the reforming process (e.g., in the form of $CO_2$).

Besides these coupling and/or deoxygenation strategies toward partially deoxygenated molecules or higher (C6+) alkanes, the production of C1-C6 alkanes with main products n-hexane and n-pentane has been reported directly from sorbitol (the hydrogenation product of glucose) either with external $H_2$ or in-situ-produced hydrogen by simultaneous APR of sorbitol over a Pt catalyst (Huber et al., *Angew. Chem. Int. Ed.* 2004 Vol. 43 pp. 1549-1551). The reaction is not selective toward a high $C_{5+}$ alkane yield, which should be the main economic target. Chen et al. (*Chem. Sus. Chem.* 2013 April; 6(4):613-21) demonstrated a process that uses a combination of Ir—$ReO_x/SiO_2$ and H-ZSM-5 mainly to selectively convert sorbitol to n-hexane via hydrogenolysis (and other lower sugar alcohols to lower alkanes). It was also demonstrated for glucose, but long reaction times were needed (up to 84 hours) due to the lower reaction temperature. The latter presumably cannot be higher due to the acceleration of C—C cracking reactions at higher temperatures. Back in 1994, Robinson filed a process for producing hydrocarbon fuels and mainly hexane from cellulose or hemicellulose (U.S. Pat. No. 5,516,960, 1996), but in essence, it comprised a multistep process beginning with the hydrolytic hydrogenation of the polysaccharide to the respective sugar alcohols, a process long since known in the art (Sharkov et al., *Angew. Chem. Int. Ed. Engl.* vol. 2: pp. 405-409), followed by subjecting the sorbitol (or other sugar alcohols) to a treatment in hydroiodic acid (HI) in boiling water to produce iodo-alkanes and hydrocarbons. Lastly, a method to convert methylated cellulose into alkanes with hydrosilylative deoxygenation via $B(C_6F_5)_3$ in the presence of an expensive hydrogen source, like $Et_2SiH_2$, was reported; but again, a minimum of two steps is needed to methylate the cellulose. Although metal-free, the use of excessive amounts of expensive silane and $B(C_6F_5)_3$ co-reagents limits its industrial prospects.

The one-step conversion of especially cellulose into to light naphtha or, e.g., n-hexane, is thus new, since both APR as well as derived processes or the HI-based process are multistep processes and/or only operate on sugars, sugar alcohols or sugar derivatives like the methylated cellulose. It would, however, be tremendously advantageous if raw polymeric cellulose or even lignocellulosic feedstock could be processed into a light naphtha fraction and mainly n-hexane right away. Due to the large natural abundance of cellulose and its uniform chemical structure with repeating C6 sugar units, cellulose is the ideal precursor for C6 alkane (or light naphtha) synthesis as C—C bond breaking and forming are not required. The biggest challenge is to selectively break C—O bonds in presence of C—C bonds and to avoid the formation of sorbitol. The sorbitol-to-alkanes route does not seem compatible with the depolymerization of cellulose.

Major obstacles for direct cellulose conversion are the poor solubility in conventional solvents and high recalcitrance toward chemical reactions. These drawbacks necessitate severe reaction conditions in terms of acidity and/or temperature, which could lead to unwanted side reactions, next to the already complex nature of the reaction network if n-hexane and light naphtha in general is targeted. A careful process incorporating a specifically modified hydrogenation catalyst is hereto proposed to accelerate only desired reactions toward formation of light naphtha.

An overview of this disclosure, which is capable of transforming cellulose directly into light naphtha via hydrodeoxygenation of in-situ-formed 5-HMF is found in FIG. 1 and the differences with the state of the art are partially pointed out in FIG. 2.

BRIEF SUMMARY

This disclosure is directed to a process to make light naphtha from carbohydrate-containing feedstock. The naphtha comprises hydrocarbons having 1 to 6 carbons, preferably 5 to 6 carbons. The process comprises hydrolysis of a carbohydrate oligomer or polymer feedstock and dehydration of the sugar monomers, in the presence of an acid catalyst, in a reaction vessel containing a biphasic reaction medium, comprising an aqueous reaction solution, containing the acid catalyst, and a substantially immiscible organic solution, containing the redox catalyst. In the preferred embodiment, the process includes an aqueous reaction solution containing the carbohydrate and an acid catalyst. The acid catalyst preferably is selected from the group consisting of mineral acids or polyacids like HPAs and others, and is present in the aqueous phase in proton concentrations of about 0.001 to 2 M, preferably between 0.01 and 0.2 M. The organic solution comprises a water-immiscible solvent, inert to catalytic hydrogenation, and preferably C4 to C12 alkanes or mixture thereof. The immiscible solvent comprises the redox catalyst. The redox catalyst is selected from the family of metals supported by carbons, having a high affinity for the organic solvent and showing high selectivity for fast 5-HMF hydrogenation in the presence of monosaccharides, to avoid decomposition of 5-HMF to levulinic acids and humine substances and to avoid sorbitol formation and their derived dehydrated compounds, like sorbitans and isosorbide. Any redox metal type may be used, as long as it fulfills the above selectivity requirement. Modification of the metal catalyst with modifiers might, therefore, be required. In a special embodiment of the disclosure, a Ru on carbon catalyst is modified with HPA to fulfill the above selectivity requirements. In a special embodiment, the produced alkane during the process act as the essentially water-immiscible solvent. The organic solution and the aqueous reaction solution preferably are present in a volume ratio of from about 0:1 to about 100:1 (ratios of 0.1:1 to 2 are preferred). The hydrolysis and dehydration reaction to 5-HMF, and its further hydrogenation in the organic phase to, e.g., 2,5-DMTHF, is carried out at a temperature ranging from about 100° C. to 210° C. Further reductive oxygen removal to convert the oxygenates to the light naphtha fraction requires somewhat higher temperatures, ranging from 190° to 280° C. The biphasic reaction is preferably carried out at pressures ranging from about 1 bar to about 200 bars, using carbohydrate feedstock solutions comprising 1-50 wt % carbohydrate (about 5 to 25 wt % is preferred).

The disclosure is more particularly directed to a method of making an alkane compound with C5 to C6 carbons. A special embodiment of the disclosure allows the presence of some oxygenates in the organic extractable phase next to the newly formed alkanes. These oxygenates may reside in the alkane fraction, or they may be isolated, e.g., via distillation or other separation processes. The isolated oxygenates are reliable fuel additives, and when removed from the alkanes, they may be used as additives to fuels. The isolated oxygenate fraction is a mixture, comprising mainly of, but not limited to, hexanol, pentanol and 2,5-DMTHF.

The method comprises hydrolyzing di- and polysaccharide feedstock and dehydrating the monosaccharides, in the presence of an acid catalyst, in a reaction vessel containing a biphasic reaction medium, under hydrogen pressure. The biphasic reaction medium preferably comprises (i) an aqueous reaction solution comprising water and the acid catalyst; and (ii) an organic extraction/reaction solution that is immiscible with the aqueous reaction solution, containing the redox catalyst. Preferably, the organic extraction/reaction solution comprises of C4 to C12 alkanes, or any other inert solvents in the applied reaction conditions are possible. Any combination of these solvents may also be used.

DETAILED DESCRIPTION

Abbreviations and Definitions

The following abbreviations and definitions are used throughout the specification and claims. Words and phrases not explicitly defined herein are to be afforded their standard definition in the art of chemistry and chemical engineering.

5-HMF: 5-(hydroxymethyl)furfural
DMTHF: 2,5-dimethyltetrahydrofuran
n-hex: n-hexane
MCP/CH: mainly methylcyclopentane and some cyclohexane
n-pent: n-pentane
1-hexol: 1-hexanol
Hexitols: sorbitol, mannitol and their anhydrides (i.e., isosorbide).
Cx: molecule with x number of carbon atoms (e.g., C5, a five-carbon-containing molecule).
Catalyst abbreviations:
Ru/C=5 wt % Ru on carbon catalyst (Sigma-Aldrich)
htTSA(x)Ru/C=Ru/C that has been hydrothermally treated with solution of x mM tungstosilic acid
htRu/C=hydrothermal treated with no tungstosilic acid
TSA (hydrate)=tungstosilicic acid (hydrate)= $H_4SiW_{12}O_{40} \cdot (xH_2O)$; a type of HPA
HPA=heteropolyacid
TSA=tungstosilicic acid
Carbohydrate-containing feedstock: A feedstock that comprises, in whole or in part, mono-, di-, oligo- or polysaccharides and/or mixtures thereof. The term "carbohydrate" in the patent refers to a carbohydrate-containing feedstock.

Light naphtha: A mixture of hydrocarbons that consists of molecules with 5 and 6 carbon atoms and usually boils between (but not limited to) 30° C. and 90° C.

Organic phase: A water-immiscible liquid phase in which reaction and extraction can occur.

Group VIIIB metal: a metal selected from the group consisting of Fe, Co, Ni, Ru, Rh, Pd, Ir, and Pt and mixtures thereof.

H-factor (H): the relative preference of a solid redox catalyst for the hydrogenation of 5-HMF over the hydrogenation of glucose, as experimentally defined in the Illustrative protocols.

Figure 1:
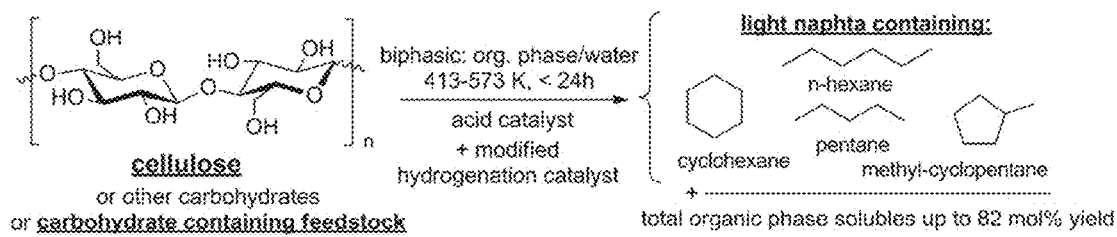
FIG. 1: Schematic overview of the proposed bio-derived light naphtha process.
Figure 2:
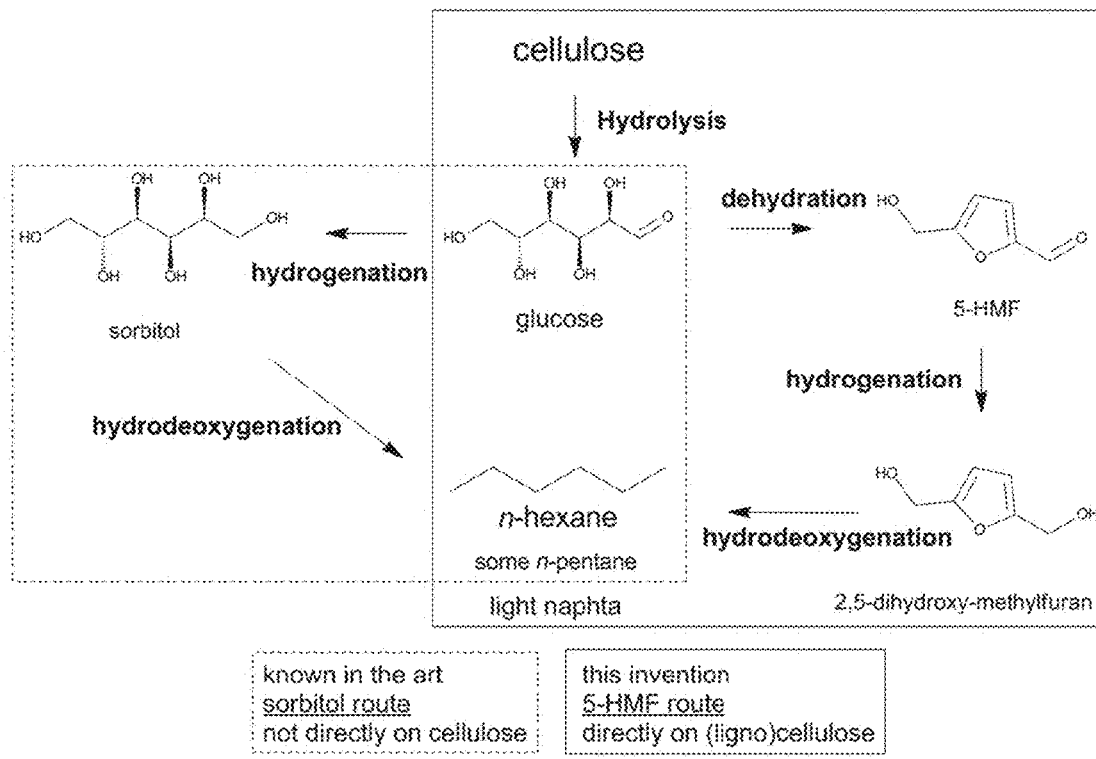
FIG. 2: The process from cellulose and carbohydrate-containing feedstock via 5-HMF to the light naphtha's major compound: hexane and the contrast with the state of the art route from sorbitol.

Overview:

In the present disclosure, a carbohydrate or carbohydrate-containing feedstock, preferably cellulose, is hydrolyzed, dehydrated and hydrogenated, in the presence of an acid and redox catalyst, to produce light naphtha, mainly composing of C5 to C6 alkanes, optionally also containing various oxygenated byproducts such as 5-HMF and C5 to C6 alcohols. FIG. 2 depicts various possible intermediate and end products for a reaction according to this disclosure, using polysaccharides with hexose monomer units as the carbohydrate reactant. Although evidence exists supporting short alkane formation via sorbitol, light naphtha is preferably obtained with more energy and carbon-efficient when proceeding via the 5-HMF route, as presented in this disclosure. Note that FIGS. 1 and 2 present representative reactants, products, and by-products, but are by no means limiting or exhaustive.

The Rationale for Converting Carbohydrates to Light Naphtha:

The light naphtha can be combined with petroleum-derived naphtha or other lower and higher boiling fractions to introduce biomass-based carbon atoms into the final hydrocarbon product, and further processed according to the state-of-the-art downstream processes. The light naphtha may be isomerized according to state-of-the-art technologies and further used as gasoline fraction. Isomers of hexane have a high energy density per volume. The light naphtha may contain some C5-C6 oxygenates, described according to the disclosure, and these may be used as such as fuel additive, or these oxygenates are separated, for instance, by distillation or other separation or adsorption technology and used as such as chemicals or added to fuels. Since the light naphtha of the disclosure contains mainly n-hexane, it may be used to synthesize bio-aromatics like benzene according to state-of-the-art technology. Since the light naphtha of the disclosure contains mainly short linear alkanes (C5 and C6), it may be the perfect feedstock for catalytic or steam cracking to produce high yields of ethylene and propylene, building blocks for, e.g., polyethylene and polypropylene. n-Hexane and the other compounds, produced according to the disclosure, may also be used as bio-chemicals and bio-solvents.

This disclosure describes a method of making light naphtha from carbohydrate-containing feedstock. In short, the method of this disclosure maximizes naphtha production using any type of carbohydrate (but most preferably from lignocellulosic sources) as the reactant. Specifically, this disclosure is a process that vastly improves the selectivity for short alkanes such as n-hexane, n-pentane, cyclohexane and methylcyclopentane (defined as the C moles produced, divided by the C moles of carbohydrate reacted) of an acid-catalyzed hydrolysis and dehydration of a concentrated (up to 25 wt %) carbohydrate feeds in a biphasic reaction solution (an aqueous reaction phase and a non-aqueous extraction/reaction phase). The redox catalyst has a high affinity to the organic phase, as measured by the clear partitioning of the catalyst in the organic phase when contacting in a water/decane biphasic system, and thus resides in the organic phase during reaction. The redox catalysts essentially also exhibit high selectivity (as measured in a standardized separate kinetic experiment) for fast hydrogenation of 5-HMF in presence of carbohydrate, and may, therefore, require modification with dopants or modifiers. The temperature control during the process is important as to maximize light naphtha formation above 80% C yield (at full carbohydrate conversion). In this particular biphasic and bi-catalytic system, light naphtha compounds can be produced at high selectivities and conversion rates.

The carbohydrate-containing feedstock may be selected from a variety of possible feedstocks. It is possible to use agricultural raw materials or waste or other raw or purified/fractionated biomass resources. The carbohydrate-containing feedstock may comprise, in whole or in part, mono-, di-, oligo- or polysaccharides and/or mixtures thereof. The carbohydrate-containing feedstock may comprise compounds other than carbohydrates. Such compounds include 5-hydroxymethylfurfural, levulinic acid, formic acid and furfural. However, preferably, mono-, di-, oligo- or polysaccharides are the major component of the carbohydrate-containing feedstock. Suitably, the carbohydrate-containing feedstock comprises from 30 to 100 wt % of mono-, di-, oligo- or polysaccharides, based on the weight of the total feedstock. More preferably, the carbohydrate-containing feedstock essentially consists of oligo and polysaccharides. More preferably, the carbohydrate-containing feedstock essentially is composed of one of, or a mixture of, the following compounds: lignocellulose, cellulose, hemicellulose, gums and starch.

In the preferred embodiment, the reactive aqueous phase contains the acid catalyst and the carbohydrate reactant (preferably derived from lignocellulose), whereas the organic phase extracts intermediate oxygenates like 5-HMF, collects the naphtha end products and serves as the reaction medium to carry out the hydrogenation and formal hydrogenolysis steps, e.g., through dehydration and hydrogenation cycles. Dehydration is favorable in the presence of water-immiscible organic solvents. Hydrogenation is favorable in the organic phase due to the higher solubility of hydrogen gas in such solvent when compared to water. The best redox catalyst, therefore, shows a high affinity for the organic phase to efficiently assist the hydrogenation reactions.

The temperature control, requiring lower temperature for the hydrolysis and dehydration, and somewhat higher temperature for the further reductive removal of oxygen atoms proved to be an important variable in the process. Many state-of-the-art techniques and reactor and process designs and operation protocols are available to tune the temperature evolution of reaction conditions optimally in favor of high light naphtha production.

The aqueous-phase-immiscible organic phase may be any solvent, which is inert to hydrogenation and significant C—C hydrogenolysis, but preferably C4 to C12 alkanes are used. The choice of solvent depends on the ultimate purpose of the light naphtha of the disclosure to be used as a bio-derived source of chemicals, fuels or fuel additives. The ratio of relative volumes of the organic and aqueous phases in the reactor, as well as the ratio of the product concentration in the organic layer to that in the aqueous layer are important variables in the process. Upon completion of the overall reaction, both phases can be separated for efficient product isolation. Although various acid catalysts, like mineral acids like HCl, $H_3PO_4$, $H_2SO_4$, etc., and solid acid-like resins and amorphous silica-alumina, sulphonates zirconia, zeolites, etc., can be used to perform hydrolysis and dehydration of carbohydrates, HPA is preferred because it shows the highest light naphtha selectivity of the common acid catalysts (see Example 5).

The Reactor: A reactor system suitable for carrying out this disclosure is illustrated schematically in FIG. 4, where the aqueous phase is shown in white and the organic phase in grey. The reactor system includes a biphasic reactor vessel R1, and a solvent evaporator E1, with recycling of the redox catalyst and some water. These components are connected by conventional conduits, which are depicted as arrows or lines in FIG. 4. Any number of conventional valves, pumps, sampling ports, injection ports, etc., explicitly not shown in FIG. 4 for purposes of clarity, may be included in the reactor system to control the flow of feed, reactants, aqueous solvents, organic solvents, and product.

In operation, the reaction of the carbohydrate feedstock takes place in the aqueous phase, at elevated temperatures. The naphtha product formed (exemplified by n-hexane, methycyclopentane, n-pentane and cyclohexane in FIG. 1) is far more soluble in the organic phase than in the aqueous phase and thus is fully extracted into the organic phase.

Figure 4:
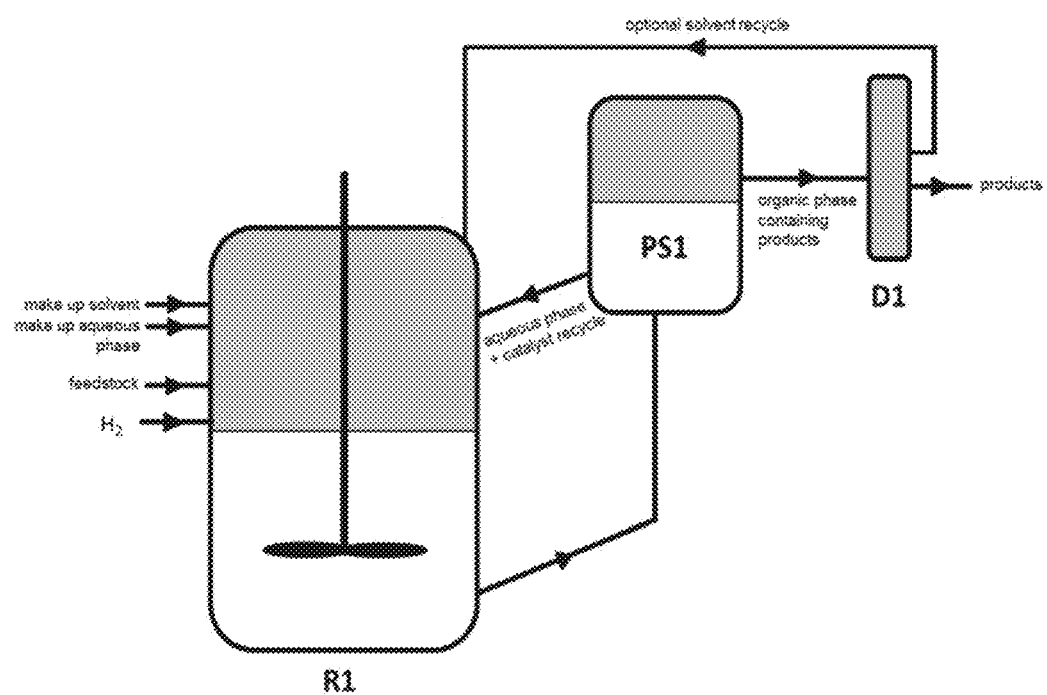
FIG. 4: One of the possible reactor and downstream setups.

In one possible configuration of operation, one can envision the use of a continuous stirred biphasic tank reactor, seen as R1 in FIG. 4. R1 is optionally fed with make-up solvent flows as well as with carbohydrate-containing feedstock. The outlet of R1 could be connected to a phase settler tank, PS1 in FIG. 4, where both phases are easily separated. The aqueous phase containing some acidic catalysts is recycled back to the reaction vessel R1. The organic fraction from vessel PS1 could be transferred to an evaporator, including removal of the redox catalyst that is subject to recycle. Or, as drawn in FIG. 4, the effluent of the organic phase of vessel PS1 could be brought to a distillation setup D1 in FIG. 4. Such distillation may be foreseen to separate the different compounds, depending on the usage of the light naphtha fraction of this disclosure. Another envisioned reactor type is the slurry reactor type, with high mixing ability of the three phases, followed by a settling or separation tank and facilities to evaporate the light naphtha and the oxygenates, if present, and to recuperate the solid catalyst in the reactor. Obviously, other reactors, known by the expert, may be used to carry out the reaction.

Thus, the first reaction step in the process comprises an acid-catalyzed hydrolysis of polymeric carbohydrates to monosaccharides, like glucose and fructose, which are further dehydrated to 5-HMF in the biphasic reactor. Because 5-HMF is very reactive toward acid degradation, extraction into the organic phase is important, where it is rapidly hydrogenated to DMTHF with the aid of the redox metal catalyst, preferably a Group VIIIB metal-containing catalyst (and most preferably a ruthenium catalyst). Depending on the reaction time and reaction temperature, the reaction is able to produce high quantities of DMTHF, together with some other oxygenates, which may be relevant chemicals or fuel additives, or light naphtha (preferably C5 and C6 alkanes), without significant formation of insoluble polymers nor permanent gaseous products (when in ambient conditions).

Using the inventive method disclosed herein, light naphtha (with low or high content of oxygenates like DMTHF), can be produced in high yields by the acid-catalyzed hydrolysis and dehydration of cellulose in a biphasic reactor using petrochemically or bio-derived low boiling point solvents, preferably alkanes, that themselves are excellent fuel components, thereby eliminating the need for expensive separation steps to produce the final liquid fuel mixture. Or, the reaction may be carried out in the bio-derived alkane fraction of this disclosure. The present method does not require usage of expensive high boiling point solvents, such as DMSO or mixed solvents containing DMSO or toxic solvents like chlorinated aromatics or chlorinated alkanes, which must be removed from the final product.

The reactive aqueous phase in the biphasic reactor contains an acid catalyst and a sugar, and the extracting/reactive phase contains the redox catalyst and an essentially water-immiscible organic solvent (e.g., decane), that continuously extracts the partially deoxygenated intermediate products like 5-HMF. The redox catalyst assists their further conversion into light naphtha, mainly n-hexane and n-pentane. Importantly, the redox catalyst has a high tendency to hydrogenate furan-type molecules like 5-HMF to 2,5-DMF and further to DMTHF (depending on the temperature), in presence of large quantities of reducing sugars, next to other analogous furan type-derived conversions, and thus the formation of sorbitol, sorbitans and isosorbide is limited and should be avoided as much as possible, as they are less efficiently converted to light naphtha (with C 5 and C 6 hydrocarbons).

To produce the high naphtha yields, as reported according to the disclosure, a highly resistant and selective carbon-supported ruthenium catalyst was developed. The rationale for using this catalyst type was that it was observed that a carbon-supported ruthenium (Ru/C) catalyst shows a high affinity for the organic phase (see photograph in FIG. 3). Though Ru/C has a too high affinity for, e.g., glucose hydrogenation to sorbitol, a modified catalyst was also created, which shows a significant increase in 5-HMF hydrogenation, while its capacity to hydrogenate glucose to sorbitol is seriously reduced. Modification was done by hydrothermally treating Ru/C in presence of HPA at elevated temperature. This HPA may be any homo- or heteropolyacid, but it was found to be the highest beneficial effect and, thus, the highest light naphtha yield with $H_4SiW_{12}O_{40}$.

Separation of the naphtha is easily performed by phase separation, and the redox catalyst may be recycled in this stage back into the catalytic reactor. If solvent is used and regeneration is desired, an additional distillation step is envisioned. If light naphtha itself is used, a bio-enriched naphtha is obtained without the need for separation. If other alkanes, or mainly alkane structures, are used of other biological resources like animal or vegetable oils, the produced alkane fraction may be applied as feedstock to fuel state-of-the-art cracking facilities to produce lighter and or isomerized fractions. Residual water is regenerated into the reactor. Removal of the oxygenates is possible through distillation due to sufficient difference in boiling points. The isolated and purified n-hexane is an ideal feedstock to produce bioaromatics like benzene according to established catalytic dehydrocyclization technology. A distillative separation of the components of the light naphtha is not required if the light naphtha of the disclosure is used for steam cracking. The isolated oxygenates are valuable chemicals and they may be used as fuel additives in a downstream process such as blending.

Feedstock: The feedstocks for use in the present method can comprise any carbohydrate-containing feedstock. Thus, for example, suitable feedstocks include hexoses (such as glucose, fructose, mannose, galactose, sorbose, etc.), pentoses (such as xylose, ribose, arabinose, etc.), as well as other mono-, di-, oligo-, and polysaccharides (such as sucrose, inulin, starch, etc.), and lignocellulosic material (such as cellulose, cellobiose, hemicellulose, xylan, etc.).

Aqueous phase: The aqueous phase comprises water and the acidic catalyst, but the addition of other salts or additives is not excluded.

Organic Phase: The preferred extractive organic phase for use in this disclosure comprises an organic solvent that is immiscible with the acidified aqueous phase. The preferred organic solvents are alkanes with 4 to 12 carbons. Thus, for example, organic solvents mainly consisting of straight or branched aliphatic hydrocarbons (like decane or isooctane) may be used, but also mixtures thereof from petrochemical or biological origin. The organic phase may also be formed during the cellulose to light naphtha and not added from the start. Though yields are somewhat lower, there is no additional effort necessary to remove and regenerate the solvent, if required for reasons of, for instance, costs.

Acid Catalysts: The disclosure requires an acid catalyst. The acid catalyst is preferably a homo- or heteropolyacid (HPA), most preferably $H_4SiW_{12}O_{40}$. Mineral acids such as HCl, $HNO_3$, $H_2SO_4$, $H_3PO_4$, $H_3BO_3$, etc.; organic acids (e.g., oxalic acid, levulinic acid, citric acid, etc.); zeolites (Si/Al from 1 to 100), acid and super-acid resins (e.g., cation exchange resin); phosphates (NbOPO4, vanadium phosphate); solid silica-, silica alumina, and titania-based supports functionalized by acid groups, and other Lewis acids may also be used.

Illustrative Protocols:

Illustrative Protocol 1: Redox Catalyst Phase Affinity

Figure 3:
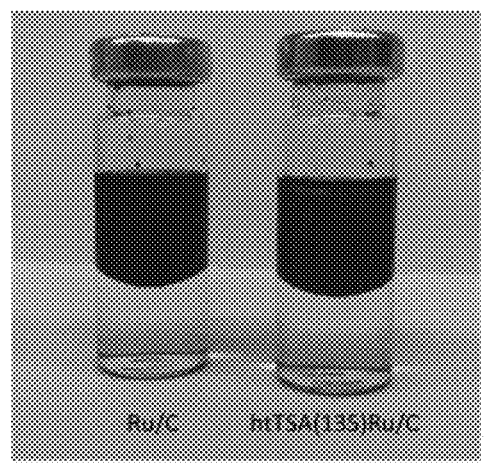
FIG. 3: Ru/C and htTSA(135)Ru/C suspended in water (lower)/n-decane(upper) biphasic medium.

Crucial to this disclosure is the fact that in the biphasic liquid conditions, the redox catalyst is situated in the upper organic phase. A separate set of experiments was carried out to show the high affinity of the redox catalyst, here Ru on carbon and a modified htTSA(135)Ru/C, for the organic phase by contacting the catalyst with a biphasic mixture of water and n-decane (1:1 vol), shaking or stirring for an hour and leave the suspension at rest. The photograph in FIG. 3 illustrates the high affinity as the catalyst is completely suspended in the upper organic phase.

Illustrative Protocol 2: Determination of H-Factor (H)

Crucial to this disclosure is the design or synthesis or use of a redox catalyst that favorably hydrogenates furan derivatives in presence of hexoses, and thus does not easily hydrogenate sugars into sugar alcohols. To benchmark this specific selectivity needed, the H-factor is determined experimentally, which indicates the relative preference of a solid redox catalyst for the hydrogenation of 5-HMF over the hydrogenation of glucose. To evaluate a redox catalyst for the purpose of this disclosure, the following experiments need to be performed in order to determine the redox catalyst's H-factor:

- A separate set of glucose (alpha-D-glucose) and HMF hydrogenation kinetic experiments must be performed;
- In the following reaction setup, a high-pressure batch reactor with top-down stirring and intermediate sampling valves (e.g., 100 ml stainless steel batch reactor of Parr Instruments Co.);
- With the following reaction conditions, 5.56 mmol substrate (HMF or glucose), 0.25 g redox catalyst (with approximately 5 wt % of redox active metal), 50 ml $H_2O$, 5 MPa H2, at 373 K for glucose and at 333 K for HMF, 700 rpm stirring;
- With intermediate sampling in the early stages of the reaction (e.g., after 5, 10, 15 and 30 minutes; and especially at low conversions) to determine the initial kinetics of the conversion of HMF and glucose via hydrogenation and to calculate the respective mmol$_{substrate\ conversion}$ h$^{-1}$.

The H-factor is calculated by dividing the initial HMF conversion rate (mmol$_{HMF\ converted}$ h$^{-1}$) by the initial glucose conversion rate mmol$_{glucose\ converted}$ h$^{-1}$.

The word "favorably" used in the text to pinpoint the essential character of the preferred hydrogenation ability of the redox catalyst to hydrogenate aromatics like furanes, rather than (non-conjugated) aldehydes like carbohydrates such as hexoses in order to produce alkanes next to some oxygenates like alcohols, ethers, furans, etc., from cellulose, or other sources of carbohydrates, is defined with an H factor that is larger than 2, and preferably larger than 5.

EXAMPLES

The examples illustrate the process disclosed and claimed herein. The examples do not limit the scope of the disclosure in any fashion. The examples show the essential processing variables for light naphtha production using the biphasic catalytic system described herein. The examples show the formation of naphtha in one step from carbohydrates and carbohydrate-containing feedstock like (ligno)cellulose.

Standard Operating Procedure for the Examples

Chemicals:

Chemicals including carbohydrates (glucose, avicel PH 101 cellulose, fructose, etc.), $H_4SiW_{12}O_{40}$, Ru/C, were obtained from Sigma-Aldrich. These reagents are also available from other commercial suppliers.

Hydrogenation Catalyst Synthesis:

Hydrothermal modification treatment of Ru/C with $H_4SiW_{12}O_{40}$ was carried out as follows: A typical modification of commercial 5 wt % Ru/C is illustrated. Ru/C (1 g), tungstosilicic acid hydrate (0.25 g) and water (40 ml) were loaded in a 100 ml stainless steel batch reactor (Parr Instruments Co.). The reactor was first flushed with $N_2$ and subsequently pressurized with 5 MPa $H_2$. The mixture was stirred at 700 rpm and heated to 483 K at an average rate of 10 K min-1 and kept at this temperature for 1 hour. The reactor was then cooled, depressurized and opened. The synthesized catalyst (htTSA(2)Ru/C) was filtered, thoroughly washed with distilled water and dried to constant weight.

Typical Catalytic Procedure:

Unless stated otherwise in the Examples, a typical catalytic experiment was carried as follows: Microcrystalline cellulose (Avicel PH-101), TSA hydrate, solid catalyst htTSA(x)Ru/C, deionized water and n-decane were loaded in a 100 ml stainless steel batch reactor (Parr Instruments Co.). The reactor was first flushed with $N_2$ and subsequently pressurized at room temperature with 5 MPa $H_2$. The mixture was stirred at 700 rpm and heated to 493 K at an average rate of 12 K min$^{-1}$ from room temperature to 423 K and at a fixed rate of 0.5 K min$^{-1}$ from 423 K to 493 K. The mixture was kept at 493 K for an additional 40 minutes. After reaction, the reactor was cooled, depressurized and opened. Samples were taken from both water and n-decane phases and centrifuged before GC (gas chromatography) and TOC (total organic carbon) analysis (details below).

Analysis of Reaction Mixtures and Quantification:

GC analysis of both aqueous and n-decane (organic phase) samples was performed on a Hewlett Packard 5890 GC equipped with an HP 7673 autosampler, a 60 m HP-1 column, and a FID. Aqueous samples were derivatized to trimethylsilyl ethers before GC analysis. For product identification, GC-MS analysis of underivatized aqueous samples was performed on an Agilent 6890 Series GC equipped with a 30 m HP-5MS column (internal diameter 0.25 mm, film thickness 0.25 μm) and an Agilent 5973 Network MS, while GC-MS analysis of n-decane samples was performed on an Agilent 6890N Network GC system equipped with a 30 m HP-1MS Ultra Inert column (internal diameter 0.25 mm, film thickness 0.25 μm) and an Agilent 5973 Network MS. HPLC analysis of aqueous samples was performed on an Agilent 1200 Series HPLC equipped with a Varian Metacarb 67C column (300*6.5 mm, mobile phase: water) and a RID, after neutralization of TSA with $Cs_2CO_3$ and filtration over a 0.45 μm NY filter. The total amount of organic carbon (TOC) in aqueous samples was determined using an Analytik Jena Multi N/C 2100 TOC Analyzer equipped with an IR detector.

GC analysis of the gaseous phase was performed on an Interscience Trace GC equipped with Hayesep Q and RTX-1 columns and a FID and TCD. For cellulose conversion determination and catalyst reuse experiments, centrifuged particles were added back to the reaction mixture. The reaction mixture was subsequently filtered, thoroughly washed and dried to constant weight.

Product yields are expressed as C mol %: yield (%)= (moles C in product/moles C in feedstock)*100. Softwood product yields were expressed as: yield (%)=(moles C in product/moles C in polysaccharides)*100. Product yields of other n-decane-soluble products besides n-hexane, methylcyclopentane, cyclohexane, n-pentane, 2,5-dimethyltetrahydrofuran and 1- or 2-hexanol were not estimated separately due to their low concentration, instead GC peak areas were summed and the C mol % yield was calculated in the same way as n-hexane. Product yields of other water-soluble products besides glucose and hexitols (and their anhydrides) were calculated based on the difference between TOC yield ((moles C in aqueous phase/moles C in feedstock)*100) and hexitol yield determined by GC. Cellulose conversion was determined gravimetrically: conversion (%)=(initial cellulose weight−weight of the solid residue after reaction−initial catalyst weight)/(initial cellulose weight)*100. The difference between conversion and total dissolved product yield was assigned as insoluble product yield. The volume of the aqueous solution after complete TSA dissolution was measured and used in TSA concentration and yield calculations.

See the various tables under the Examples for a complete tabulation of the data discussed in the Examples, as well as the referenced figures.

Examples 1A, 1B and 1C

Light Naphtha from Cellulose—Example 1A

Cellulose, a polysaccharide of glucose with β(1,4) glycosidic bonds, was converted according to the disclosure into light naphtha. The typical catalytic procedure described above was used with the following quantities: 2 g of cellulose, 5 g of TSA hydrate (corresponding to 71 mM TSA in the aqueous phase), 0.5 g htTSA(135)Ru/C, 20 ml of deionized water and 20 ml of n-decane. Results are found in Table 1.

TABLE 1

| | Yields [%] | | | |
|---|---|---|---|---|
| Organic phase | | | Aqueous phase | |
| LIGHT NAPHTHA | C5 and C6 oxygenates | TOTAL ORG | Hexitols | TOTAL AQUEOUS |
| 48 | 10 | 65 | 7 | 15 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

Light Naphtha from Cellulose—Example 1B

To further demonstrate the disclosure, cellulose was converted according to the disclosure into light naphtha with different amounts of solid catalyst according to the typical catalytic procedure described above with use of the following quantities: 2 g of cellulose, 5 g of TSA hydrate (corresponding to 71 mM TSA in the aqueous phase), varying amounts of htTSA(2)Ru/C, 20 ml of deionized water and 20 ml of n-decane. Results are found in Table 2. With 0.24 and 0.48 g of catalyst, the light naphtha yield (C5+C6 alkanes) respectively mounted to 52% and 58%.

TABLE 2

| | Yields [%] | | | | |
|---|---|---|---|---|---|
| Redox | Organic phase | | | Aqueous phase | |
| catalyst amount | LIGHT NAPHTHA | C5 and C6 oxygenates | TOTAL ORG | Hexitols | TOTAL AQUEOUS |
| 0.48 g | 58 | 9 | 73 | 9 | 18 |
| 0.24 g | 52 | 14 | 74 | 7 | 16 |
| 0.12 g | 38 | 9 | 60 | 2 | 16 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

Light Naphtha from Cellulose—Example 1C

To further demonstrate the disclosure, cellulose was converted according to the disclosure into light naphtha and the composition of the reactor was monitored in time. The typical catalytic procedure described above was repeated in six-fold, but stopped after different times (and thus sometimes at different temperatures) during the reaction by rapid quenching in ice. The reaction temperature profile according to the typical catalytic procedure needs 140 minutes to reach 493 K. For the longest reaction, the mixture was kept at 493 K for an additional 220 minutes instead of the above-mentioned 40 minutes. The total reaction time, with the heating period included, then mounts to 6 hours instead of the typical 3 hours. The following quantities were used: 2 g of cellulose, 5 g of TSA hydrate, 0.24 g htTSA(2)Ru/C, 30 ml of deionized water and 10 ml of n-decane. The results of this time profile are found in FIG. 5, which plots the product distribution and total cellulose conversion with the designation of the time and temperature at which the identical reactions were quenched. The yield of both water- and n-decane-soluble 1-hexanol and 2,5-DMTHF is combined to clarify the product flows.

The conversion of cellulose proceeded rapidly, reaching 40% and 90% at 30 and 60 minutes, respectively. The total light naphtha yield (when one only counts the sum of oxygen-free alkane (n-hexane, cyclohexane, methylcyclopentane and n-pentane) mounts to 75% after 6 hours, including 52% of n-hexane. Total n-decane soluble yields mounts to 82% including other n-decane-soluble products n-butane (2.3%) and high molecular weight products (3%).

Figure 5:
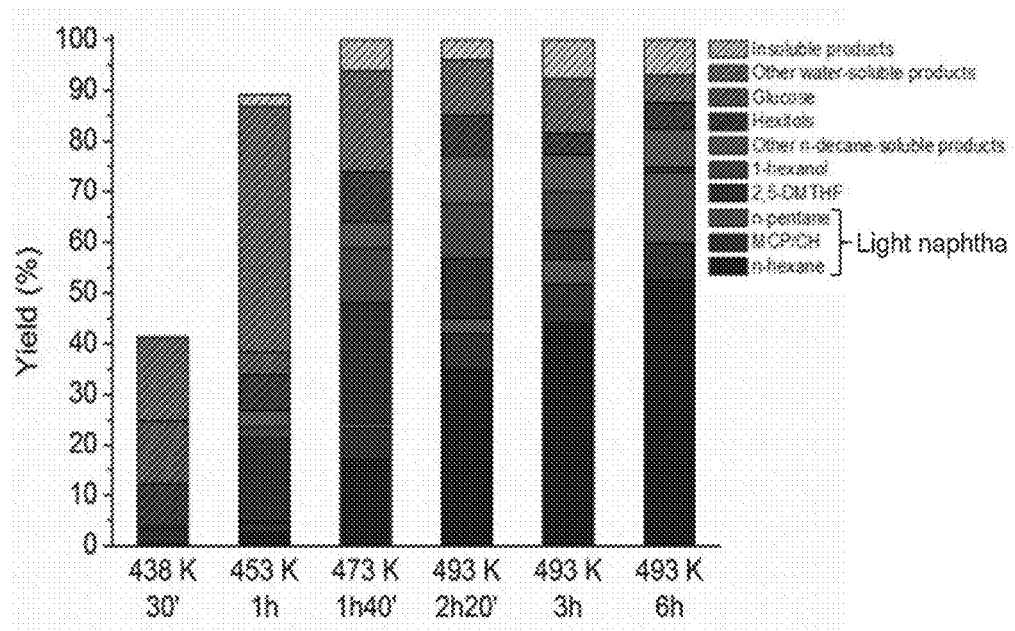
FIG. 5: Time profile of a typical reaction for the conversion of cellulose into light naphtha according to the disclosure and Example 1C.

It is clear from FIG. 5 that the hexitols that are formed in the early stages of the reaction are stable and resist formal hydrodeoxygenation under these conditions; they are thus to be avoided when light naphtha production is the objective with this process.

Figure 6:
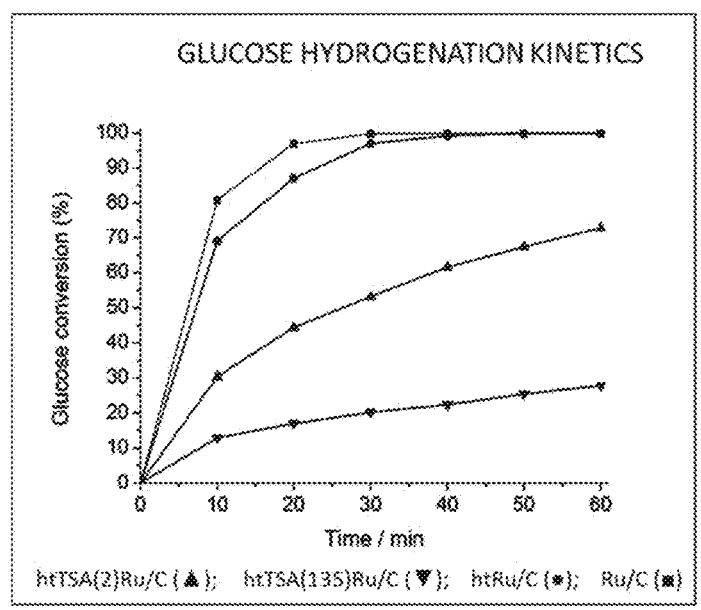
FIG. 6: Glucose hydrogenation kinetics with different solid catalysts according to Example 2.
Figure 7:
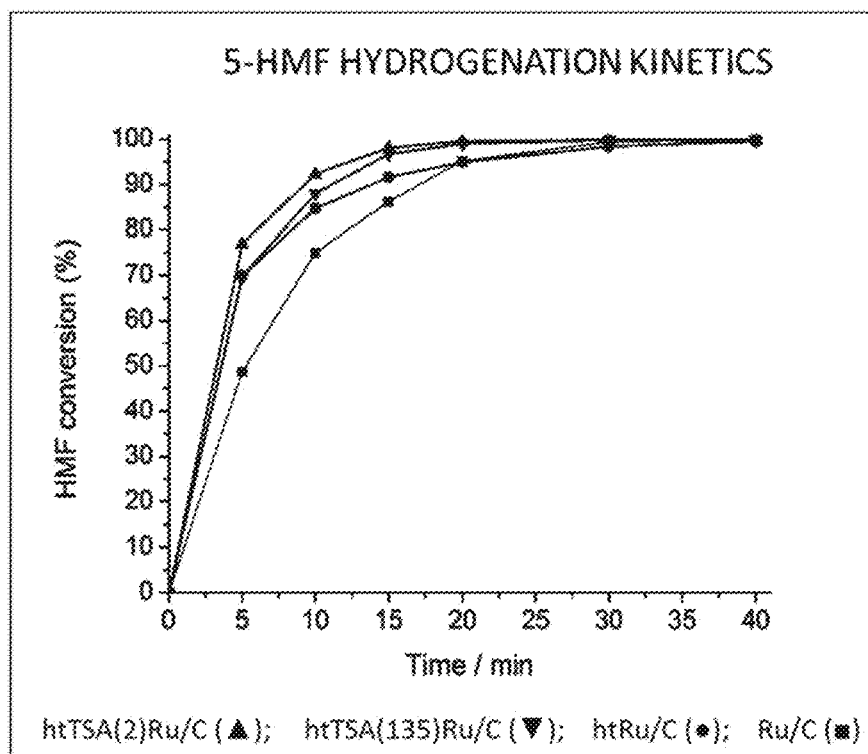
FIG. 7: 5-HMF hydrogenation kinetics with different solid catalysts according to Example 2.
Figure 8:
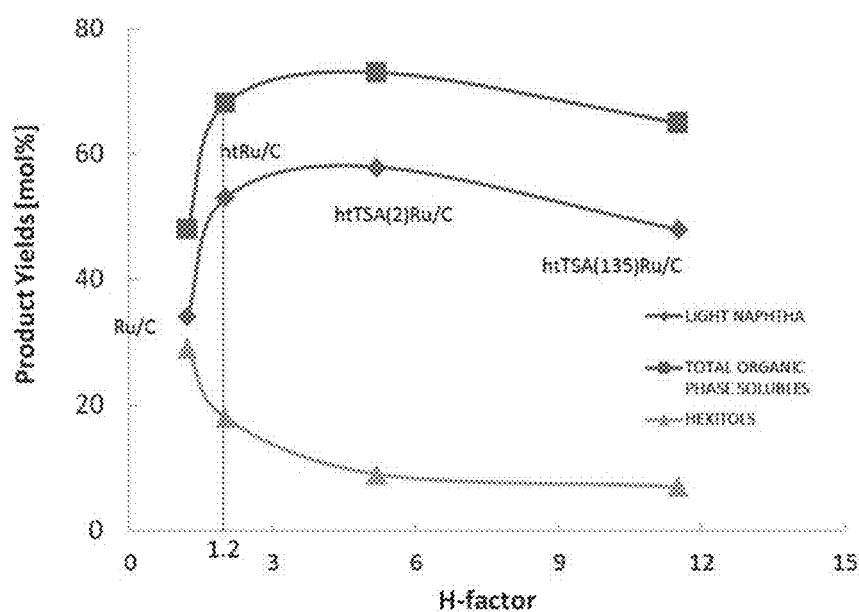
FIG. 8: The H-factor and its correlation with the light naphtha, total organic phase soluble products and hexitols production from cellulose for different catalysts (according to Example 3).

The conversion of cellulose was achieved during the reactor heating stage between 423-453 K. During this interval, 2,5-DMTHF, glucose, some hexitols and their anhydrides and other water-solubles including 5-HMF, 2,5-hexanedione and 1,2-hexanediol are formed. The accumulation of glucose and low hexitol yield are again indicative of a reduced glucose hydrogenation activity, in agreement with the data presented in Examples 2 and 3 later (FIG. 6, FIG. 7, FIG. 8). The inability of the solid catalyst to rapidly hydrogenate glucose opens a fast cascade reaction via HMF (seen later in FIG. 9), which is mainly hydrogenated to 2,5-DMTHF, but also to some extent converted into its linear water soluble derivatives like 2,5-hexanedione and 1,2-hexanediol. After one hour and a half, when the reactor is between 453 and 473 K, 1,2-hexanediol and 2,5-hexanedione were mostly converted. It is also in this period that MCP/CH is produced via intramolecular condensation reaction of some of the linear oxygenates. The partial conversion of 2,5-hexanedione into MCP is confirmed in Example 8 (later). 1-hexanol and 2,5-DMTHF are rather stable and accumulate in the reaction medium. Further increase of the reaction temperature to 493 K and a prolonged total reaction time up to six hours, converted 2,5-DMTHF to n-hexane and 1-hexanol to n-pentane and n-hexane. Note indeed that the n-pentane fraction is mainly formed at this last stage of the reaction, also in agreement with the data presented later in Example 8.

Example 2

Determination of the H-Factor for Ru/C and Different Modified Ru/C-Based Redox Catalyst Separate sets of experiments were carried out for the competitive hydrogenation reaction between glucose and 5-HMF according to the illustrative protocol no. 2. The H-factor was determined for a set of different catalysts: unmodified Ru/C; hydrothermal treated htRu/C and two hydrothermally modified catalysts that were pretreated in either a 2 or 135 mM solution of TSA.

One graph (FIG. 6) shows the kinetic profile of the glucose hydrogenation experiments according to the protocol, while the other graph (FIG. 7) shows that of 5-HMF hydrogenation. The two graphs in FIG. 6 and FIG. 7 nicely illustrate that modification of the Ru on carbon catalyst with HPA modifiers like $H_4SiW_{12}O_{40}$ drastically impact the hydrogenation selectivity. The more concentrated the HPA solution of the hydrothermal solution, and the more HPA immobilizes on the catalyst, the lower is the hydrogenation capacity of glucose, while the hydrogenation ability of 5-HMF slightly increases. To quantify this selectivity, from these graphs, the initial HMF conversion rate ($mmol_{HMF\ converted}\ h^{-1}$) and the initial glucose conversion rate ($mmol_{glucose\ converted}\ h^{-1}$) was calculated, which then allowed for the calculation of the H-factor for these four catalysts, which is found in Table 3.

TABLE 3

| redox catalyst | rate HMF conversion mmol · h$^{-1}$ | rate glucose conversion mmol · h$^{-1}$ | H-factor |
|---|---|---|---|
| Ru/C | 33 | 27 | 1.2 |
| htRu/C | 46 | 23 | 2.0 |
| htTSA(2)Ru/C | 52 | 10 | 5.2 |
| htTSA(135)Ru/C | 46 | 4 | 11.5 |

Example 3

Illustration of the Importance of the H-Factor for the Light Naphtha Production from Cellulose In this example, the redox catalysts from Example 2 were used for the direct conversion of cellulose into light naphtha according to the disclosure. Hereto, the typical catalytic procedure described above was used with the following quantities: 2 g of cellulose, 5 g of TSA hydrate (corresponding to 71 mM TSA in the aqueous phase), 20 ml of deionized water and 20 ml of n-decane. The reactions were carried out in the presence of 0.5 g of redox catalyst. Results are found in FIG. 8. As evidenced, the selective hampering of glucose hydrogenation activity while still allowing 5-HMF (and derivatives) hydrogenation activity is crucial to obtain high yields of light naphtha in this direct carbohydrate-containing feedstock conversion process. The H-value of 1.2 is clearly too low to attain decent yields of light naphtha.

Example 4

Effect of Degree of Redox Catalyst Modification with TSA

In this example, the effect of the acid concentration during the hydrothermal solid catalyst pretreatment itself on the light naphtha formation from cellulose was investigated. Hereto, the typical catalytic procedure described above was used with the following quantities: 2 g of cellulose, 5 g of TSA hydrate (corresponding to 71 mM TSA in the aqueous phase), 20 ml of deionized water and 20 ml of n-decane. The reactions were carried out in the presence of 0.5 g of different solid catalysts: unmodified Ru/C; hydrothermally treated htRu/C and different hydrothermally modified catalysts that were treated in different mM solution of TSA (htTSA(xx)Ru/C). Results are found in Table 4.

TABLE 4

| | Yields [%] | | | | |
|---|---|---|---|---|---|
| | Organic phase | | | Aqueous phase | |
| Redox Catalyst | LIGHT NAPHTHA | C5 and C6 oxy-genates | TOTAL ORG | Hex-itols | TOTAL AQUEOUS |
| htTSA(135)Ru/C | 48 | 9 | 65 | 7 | 15 |
| htTSA(71)Ru/C | 46 | 10 | 63 | 10 | 17 |
| htTSA(37)Ru/C | 46 | 11 | 63 | 9 | 18 |
| htTSA(15)Ru/C | 50 | 10 | 67 | 8 | 17 |
| htTSA(8)Ru/C | 52 | 12 | 71 | 10 | 18 |
| htTSA(2)Ru/C | 58 | 9 | 73 | 9 | 18 |

TABLE 4-continued

| | Yields [%] | | | | |
|---|---|---|---|---|---|
| | Organic phase | | | Aqueous phase | |
| Redox Catalyst | LIGHT NAPHTHA | C5 and C6 oxy-genates | TOTAL ORG | Hex-itols | TOTAL AQUEOUS |
| htRu/C | 53 | 4 | 68 | 18 | 21 |
| Ru/C | 34 | 6 | 48 | 29 | 36 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

The catalysts that were hydrothermally treated in the presence of small amounts of TSA show far higher light naphtha yields in the organic phase than the unmodified Ru/C catalyst. The latter has the tendency to selectively produce hexitols by hydrogenation of glucose instead of light naphtha. Under the used conditions, hexitols are rather stable as witnessed therein, as well as in Example 8 and Example 1C. The reason for the appreciable yield (which is much lower than in the case of the modified catalyst) of decane-solubles and light naphtha with the unmodified Ru/C catalyst is mainly caused by the biphasic nature of the medium and the careful reactor heating program. In absence of these factors, in pure aqueous media, hexitols (and mainly isosorbide) are nearly the only products found, as known from the state of the art (*Chem. Sus. Chem.* 2013, vol. 6 pages 199-208).

The degree of catalyst modification, varied here, but not limited to, by varying concentrations of TSA in the pretreating solutions, appreciably influences the yields of organic phase soluble products and the composition of the light naphtha products therein. The non-acidic hydrothermal treatment as well also slightly increases the light naphtha yield but not in the same degree as the catalysts pretreated in TSA solutions.

Example 5

Effect of Acid Concentration in Aqueous Solution

In this example, the effect of the soluble TSA acid catalyst concentration on the light naphtha formation from cellulose was investigated. Hereto, the typical catalytic procedure described above was used with the following quantities: 2 g of cellulose, varying amounts of TSA hydrate (corresponding to the tabulated mM TSA in the aqueous phase), 0.5 g htTSA(135)Ru/C, 20 ml of deionized water and 20 ml of n-decane. The concentration of soluble TSA in the aqueous phase was varied between 0 and 135 mM as shown below. Results are found in Table 5. Clearly, the presence of the acid catalyst is required as seen in the 0 mM acid experiment. An optimal value of acid concentration can be found for a given system if n-hexane is desired, whereas different product compositions can be attained with different amounts of acid. High MCP/CH yields are, for instance, found for the most acidic solutions tested. The highest light naphtha yields were encountered for the highest concentrations of acid; whereas higher total organic phase-soluble product yields were found for solutions with intermediate acid concentrations. The composition of the produced light naphtha was also clearly influenced by the acid concentration.

TABLE 5

| acid catalyst (TSA) concentration in mM | Yields [%] | | | | |
|---|---|---|---|---|---|
| | Organic phase | | | Aqueous phase | |
| | C5 and | | | | |
| | LIGHT NAPHTHA | C6 oxygenates | TOTAL ORG | Hexitols | TOTAL AQUEOUS |
| 135 | 46 | 7 | 60 | 8 | 18 |
| 71 | 41 | 15 | 64 | 7 | 19 |
| 37 | 33 | 24 | 64 | 7 | 20 |
| 15 | 20 | 31 | 58 | 6 | 31 |
| 0 | 0 | 0 | 1 | 5 | 17 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

Example 6

Effect of Temperature Control of the Reactor

In this example, the effect of the temperature control of the reactor on the light naphtha formation from cellulose was investigated. The typical catalytic procedure described above was used with the exception of the final temperature and the variation of the heating profile. The mixture was kept at 483 K for an additional 60 minutes after the heating program. The following quantities were used: 2 g of cellulose, 0.5 g htTSA(135)Ru/C, 10 g of TSA hydrate (corresponding to 135 mM TSA in the aqueous phase), 20 ml of deionized water and 20 ml of n-decane. Results for three temperature profiles are found in Table 6. A slower heating rate from 423 K onward clearly benefits the yields of n-hexane and thus light naphtha and the total production of n-decane-soluble products. One of such careful heating programs can be followed as well in FIG. 5 of Example 1C. It should be noted that these specific heating programs here are merely illustrative and not limiting to the disclosure as many other, suited, carefully tuned thermal programs can be found.

TABLE 6

| Temperature profile | Yields [%] | | | | |
|---|---|---|---|---|---|
| | Organic phase | | | Aqueous phase | |
| | C5 and | | | | |
| | LIGHT NAPHTHA | C6 oxygenates | TOTAL ORG | Hexitols | TOTAL AQUEOUS |
| RT to 423 K: 17 K min$^{-1}$ 423 K to 483 K: 5.5 K min$^{-1}$ | 32 | 4 | 42 | 6 | 17 |
| RT to 423 K: 12 K min$^{-1}$ 423 K to 483 K: 0.5 K min$^{-1}$ | 46 | 7 | 60 | 8 | 18 |
| RT to 423 K: 12 K min$^{-1}$ 423 K to 443 K: 0.5 K min$^{-1}$ 443 K to 483 K: 0.5 K min$^{-1}$ | 43 | 6 | 56 | 12 | 22 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

Example 7

Effect of Hydrogen Pressure

In this example, the effect of the external hydrogen pressure on the light naphtha formation from cellulose was investigated. The typical catalytic procedure described above was used with the exception of the variation of hydrogen pressure and the final temperature and profile: reactions were carried out at 483 K, reached at an average rate of 12 K min$^{-1}$ from room temperature to 423 K, at a fixed rate of 0.2 K min$^{-1}$ from 423 K to 443 K and at a fixed rate of 2 K min$^{-1}$ from 443 K to 483 K. The mixture was kept at 483 K for an additional 60 minutes. The following quantities were used: 2 g of cellulose, 0.5 g htTSA(135)Ru/C, 10 g of TSA hydrate (corresponding to 135 mM TSA in the aqueous phase), 20 ml of deionized water and 20 ml of n-decane. Results for three different pressures are found in Table 7. Although hydrogen is crucial to the process, the experimental differences in yields and selectivities do not greatly vary with variation in pressure between 40, 50 and 70 bars of $H_2$ (pressures at room temperature). This indicates that the hydrogen pressure at which the process can run may greatly vary.

TABLE 7

| $H_2$ Pressure added at room temperature, in bars | Yields [%] | | | | |
|---|---|---|---|---|---|
| | Organic phase | | | Aqueous phase | |
| | C5 and | | | | |
| | LIGHT NAPHTHA | C6 oxygenates | TOTAL ORG | Hexitols | TOTAL AQUEOUS |
| 40 | 42 | 8 | 57 | 8 | 19 |
| 50 | 43 | 6 | 56 | 12 | 22 |
| 70 | 39 | 7 | 51 | 10 | 20 |

LIGHT NAPHTHA = n-hexane + MCP/CH (mainly methylcyclopentane and some cyclohexane) + n-pentane.
C5 and C6 oxygenates = Other oxygenated organic phase (decane) solubles with 5 or 6 carbon atoms: mainly 2,5-dimethyltetrahydrofuran and 1-hexanol.
hexitols = sorbitol, mannitol and their anhydrides (i.e., isosorbide).
TOTAL ORG = total molar yield of products analyzed in the organic phase (besides light naphtha and C5 and C6 oxygenates; among others n-butane, 2-methyltetrahydrofuran or 2-methyltetrahydro-2H-pyran can be identified)
TOTAL AQUEOUS = total molar yield of products analyzed in the Aqueous phase.

Example 8

Effect of Substrate Type

Figure 9:
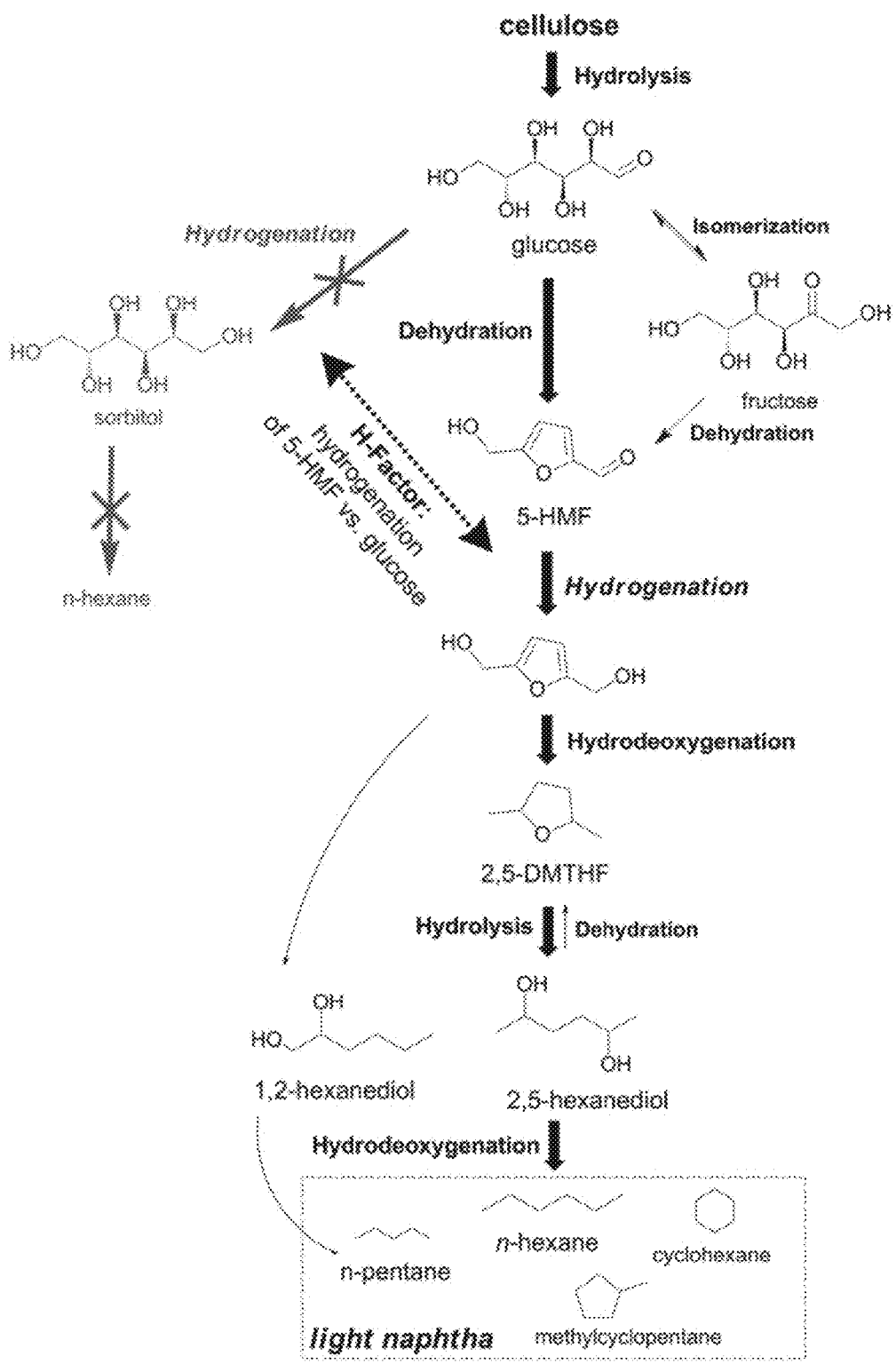
FIG. 9: Main reaction path followed in this disclosure for the synthesis of the light naphtha and its major constituent n-hexane, directly from cellulose, via 5-HMF and by avoiding sorbitol. The H-factor's importance is shown.

To further demonstrate the disclosure, a series of carbohydrate-containing feedstock, carbohydrates, carbohydrate derivatives and possible intermediates were subjected to a catalytic experiment according to the disclosure. Hereto, the typical catalytic procedure described above was used with the following quantities: 0.5 g htTSA(2)Ru/C, 5 g of TSA hydrate (corresponding to 71 mM TSA in the aqueous phase), 20 ml of deionized water and 20 ml of n-decane. The added carbon amount of the feedstock (substrate) approximates the carbon amount in 2 g of Avicel PH-101 cellulose, e.g., for glucose, 2.15 g was introduced. Results are found in Table 8, in which the more precise product distributions can be found. The yield of light naphtha can be found by adding n-hex+MCP/CH+n-pent. From sorbitol and isosorbide, light naphtha yields are clearly very low as these molecules are very stable in the process conditions. This was also evidenced from Example 1C and FIG. 5. The yields of n-hexane from the DMTHF intermediate (a product from mild hydrodeoxygenation/hydrogenation of 5-HMF) are very high. 5-HMF in itself could not be tested in batch due to its notorious unstable nature at high concentrations. Based on this substrate type study, the time profile of Example 1C seen in FIG. 5 and the effect of H-factor of Examples 2 and 3 seen in FIGS. 6, 7 and 8, a reaction network of the process running via 5-HMF is well corroborated and this detailed Scheme is seen in FIG. 9. In FIG. 9, the crucial preference for the path via 5-HMF and the undesired sorbitol pathway is clearly marked with the H-factor.

As can be seen in Table 8, besides cellulose, glucose and fructose (two carbohydrates) are valuable feedstocks as well for the process with high light naphtha yields.

ment costs and energy. Hereto, the typical catalytic procedure described above was used with the following quantities: 2 g of sawdust, 0.24 g htTSA(2)Ru/C, 5 g of TSA hydrate, 30 ml of deionized water and 10 ml of n-decane. An appreciable light naphtha yield of 58%, including 38% n-hexane (calculated on the polysaccharide content of the wood only) was attained at full conversion of the polysaccharide component after a total reaction time of 6 hours (effectively 220 minutes of reaction after 493 K was reached).

This high light naphtha yield directly from wood in a one-step process was surprising to a person skilled in the art and demonstrated the inventive step and direct applicability of the process.

The invention claimed is:

1. A biphasic solvent catalytic process of producing light naphtha, the process comprising:
    supplying an aqueous reaction solution, a carbohydrate-containing feedstock, an acid catalyst, a substantially water-immiscible organic phase, and a redox catalyst into a reaction vessel under hydrogen pressure to generate a biphasic liquid medium, wherein the biphasic liquid medium comprises the aqueous reaction solution mainly comprising the carbohydrate-containing feedstock and the acid catalyst, and wherein the organic phase mainly comprises the redox catalyst and functions as an organic extraction and reaction solution,
    energizing or heating the biphasic liquid medium, thus inducing conversion of carbohydrate in the aqueous phase to a furan derivative, and
    extracting the furan derivative into the organic phase so as to hydrogenate the furan derivative into light naphtha,

TABLE 8

| | Yields [mol %] | | | | | | | | | | |
|---|---|---|---|---|---|---|---|---|---|---|---|
| | Organic phase | | | | | | | Aqueous phase | | | Total |
| Feedstock | n-hex | MCP/CH | n-pent | DMTHF | hexol | Other | Sum | Hexitols | Other | Sum | Sum |
| Cellulose | 42 | 4 | 12 | 8 | 1.5 (1) | 6 | 73 | 9 | 9 | 18 | 90 |
| Sorbitol | 12 | 3 | 10 | 1 | 0.3 (1) | 5 | 30 | 60 | 4 | 64 | 94 |
| Isosorbide | 9 | 1 | 6 | 1 | 0.2 (1) | 3 | 19 | 70 | 3 | 73 | 92 |
| Glucose | 44 | 8 | 17 | 4 | 0.1 (1) | 11 | 83 | 4 | 4 | 8 | 91 |
| Fructose | 35 | 3 | 7 | 5 | 1.3 (1) | 11 | 62 | 3 | 7 | 9 | 71 |
| DMTHF | 83 | 0 | 0 | 8 | 0 | 1 | 92 | 0 | 3 | 3 | 95 |
| 2,5-hexanediol | 74 | 0 | 1 | 7 | 0.2 (2) | 2 | 83 | 0 | 4 | 4 | 87 |
| 2,5-hexanedione | 91 | 0 | 1 | 8 | 0.1 (2) | 2 | >100 | 0 | 3 | 3 | >100 |
| 1,2-hexanediol | 40 | 0 | 52 | 0 | 0.1 (1) | 2 | 94 | 0 | 2 | 2 | 96 |
| 2-hexanol | 94 | 0 | 0 | 0 | 0 | 1 | 95 | 0 | 1 | 1 | 96 |
| 1-hexanol | 37 | 0 | 49 | 0 | 0.2 (1) | 1 | 87 | 0 | — | — | 87 | n-hex = n-hexane;
MCP/CH = mainly methylcyclopentane and some cyclohexane;
n-pent = n-pentane;
DMTHF = 2,5-dimethyltetrahydrofuran;
hexol = 1-or 2-hexanol, as indicated between parentheses;
hexitols = sorbitol, mannitol and their anhydrides (i.e., isosorbide).
Other = sum of yields of other decane-soluble products like n-butane, 2-methyltetrahydrofuran or 2-methyltetrahydro-2H-pyran) or sum of yields of other water-soluble products (like HMF, levulinic acid or 1,2-hexanediol).

Example 9

Conversion of Wood (Lignocellulose) into Light Naphtha

In this example, the process according to the disclosure was used to convert an actual lignocellulose feedstock into light naphtha to assess the robustness of the catalytic process. Softwood sawdust (from a local sawmill) was chosen as the substrate. Apart from cutting, no other pretreatment of the wood sample was foreseen as to omit biomass pretreatwherein the redox catalyst is typified by an H factor larger than 2.

2. A process to make light naphtha, the process comprising:
    utilizing a reaction vessel under hydrogen pressure containing a biphasic liquid medium comprising an aqueous reaction solution and a substantially water-immiscible organic extraction and reaction solution;

wherein the aqueous reaction solution contains at least a carbohydrate-containing feedstock and an acid catalyst and the substantially water-immiscible organic extraction and reaction solution contains at least a redox catalyst to attain light naphtha;

wherein the carbohydrate is converted in the aqueous reaction solution into a furan derivative, wherein the furan derivative is extracted from the aqueous reaction solution and converted to light naphtha in the substantially water-immiscible organic extraction and reaction solution in presence of the redox catalyst; and wherein the redox catalyst favorably hydrogenates furan derivatives in presence of hexoses.

3. The process according to claim 2, wherein the redox catalyst is characterized by an H-factor larger than 2.

4. The process according to claim 1, wherein the carbohydrate in the carbohydrate-containing feedstock is selected from the group consisting of starch, cellulose, hemicellulose, lignocellulose, and a mixture thereof.

5. A biphasic solvent catalytic process for producing light naphtha, the process comprising:

supplying into a reaction vessel under hydrogen pressure: an aqueous reaction solution, a carbohydrate-containing feedstock, an acid catalyst, a substantially water-immiscible organic phase, and a redox catalyst so as to generate a biphasic liquid medium comprising an aqueous phase and an organic phase, wherein the organic phase mainly comprises the redox catalyst and functions as an organic extraction and reaction solution, energizing or heating the biphasic liquid medium to induce conversion of carbohydrate in the aqueous phase to a furan derivative, and extracting the furan derivative with the organic phase so as to hydrogenate the furan derivative into light naphtha, wherein the relative hydrogenation reactivity factor H of the redox catalyst is greater than or equal to 1.25.

6. The process according to claim 1, wherein the redox catalyst comprises a metal selected from the group consisting of Fe, Co, Ni, Ru, Rh, Pd, Ir, and Pt, and mixtures thereof.

7. The process according to claim 1, wherein the redox catalyst is modified with heteropolyacid (HPA).

8. The process according to claim 1, wherein the acid catalyst is an inorganic acid.

9. The process according to claim 1, wherein the acid catalyst is selected from the group consisting of homopolyacids and heteropolyacids.

10. The process according to claim 1, wherein the organic extraction and reaction solution comprises a solvent selected from the group consisting of water-immiscible, linear, branched and cyclic alkanes, or mixtures thereof.

11. The process according to claim 1, wherein the major part of the hydrolysis and dehydration reactions mainly occur at a temperature ranging from 70° C. to 200° C., and a further hydrodeoxygenation is occurring at a temperature ranging from 150° C. to 350° C.

12. The process according to claim 1, wherein the hydrogen pressure(s) ranges from 1 to 150 bars.

13. The process according to claim 1, wherein the carbohydrate-containing feedstock comprises 1 to 50 wt % of the total reaction mixture.

14. A method of converting a carbohydrate-containing feedstock directly to light naphtha and a family of organic phase soluble oxygenates, essentially comprising molecules with 5 and 6 carbon atoms in a reaction vessel under hydrogen pressure, the method comprising:

at least the carbohydrate and an acid catalyst in an aqueous reaction phase and at least a redox catalyst in an organic extractive and reaction phase, wherein the carbohydrate is converted to hydroxymethylfurfural ("HMF") in the aqueous reaction phase, wherein the HMF is extracted in the organic extractive and reaction phase and further hydrodeoxygenated to light naphtha.

15. The method according to claim 14, wherein the carbohydrate in the carbohydrate-containing feedstock is selected from the group consisting of starch, cellulose, hemicellulose, lignocellulose, and a mixture thereof.

16. The method according to claim 14, wherein relative hydrogenation reactivity factor H of the redox catalyst is equal to or larger than 1.25.

17. The method according to claim 14, wherein the redox catalyst comprises a metal selected from the group consisting of Fe, Co, Ni, Ru, Rh, Pd, Ir, and Pt, or a mixture thereof.

18. The method according to claim 14, wherein the redox catalyst is modified with heteropolyacid (HPA).

19. The method according to claim 14, wherein the acid catalyst is an inorganic acid.

20. The method according to claim 14, wherein the acid catalyst is selected from the group consisting of homopolyacids and heteropolyacids.

21. The method according to claim 14, wherein the organic extractive and reaction solution comprises a solvent selected from the group consisting of water-immiscible, linear, branched, cyclic alkanes, and mixtures thereof.

22. The method according to claim 14, wherein the major part of the hydrolysis and dehydration reactions mainly occur at a temperature ranging from 70° C. to 200° C., and the further hydrodeoxygenation is occurring at a temperature ranging from 150° C. to 350° C.

23. The method according to claim 14, wherein the hydrogen pressure(s) ranges from 1 to 150 bars.

24. The method according to claim 14, wherein the carbohydrate-containing feedstock comprises 1 to 50 wt % of the total reaction mixture.

* * * * *